US012571982B2

(12) United States Patent
Otsuka et al.

(10) Patent No.: US 12,571,982 B2
(45) Date of Patent: Mar. 10, 2026

(54) ZOOM LENS DEVICE AND OPTICAL DEVICE

(71) Applicant: FUJIFILM Corporation, Tokyo (JP)

(72) Inventors: Shinji Otsuka, Saitama (JP); Satoru Nemoto, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 469 days.

(21) Appl. No.: 18/156,782

(22) Filed: Jan. 19, 2023

(65) Prior Publication Data

US 2023/0152555 A1 May 18, 2023

Related U.S. Application Data

(63) Continuation of application No. PCT/JP2021/027446, filed on Jul. 26, 2021.

(30) Foreign Application Priority Data

Jul. 31, 2020 (JP) ................................. 2020-130635

(51) Int. Cl.
*G02B 7/10* (2021.01)
*G02B 7/02* (2021.01)
*G02B 15/14* (2006.01)

(52) U.S. Cl.
CPC .............. *G02B 7/10* (2013.01); *G02B 7/023* (2013.01); *G02B 7/026* (2013.01); *G02B 15/14* (2013.01)

(58) Field of Classification Search
CPC ........ G02B 26/10; G02B 7/022; G02B 7/026; G02B 21/22; G02B 7/023; G06B 15/14
(Continued)

(56) References Cited

U.S. PATENT DOCUMENTS

2007/0229980 A1* 10/2007 Matsumoto .............. G02B 7/10
359/699
2010/0214671 A1* 8/2010 Fukino ................... G02B 7/102
359/823
(Continued)

FOREIGN PATENT DOCUMENTS

JP        H04-345112 A      12/1992
JP        H08-136791 A       5/1996
(Continued)

OTHER PUBLICATIONS

International Search Report issued in PCT/JP2021/027446; mailed Oct. 12, 2021.
(Continued)

*Primary Examiner* — Daniel St Cyr
(74) *Attorney, Agent, or Firm* — Studebaker Brackett PLLC

(57) ABSTRACT

Provided is a zoom lens device and an optical device with which it is possible to increase a moving distance of a moving cylinder in an optical axis direction without an increase in number of components, the moving cylinder including a lens group closest to a subject side. A zoom lens device (1) includes a fixed cylinder (30), a cam cylinder (20) that is positioned outside the fixed cylinder (30), a first movement group that is positioned outside the cam cylinder (20) and that includes a first lens group (H1) provided at a distal end portion, and a second movement group that is positioned inside the fixed cylinder (30) and that includes a second lens group (H2). The first movement group includes a first straight groove (4) that guides the first movement group straight and a first cam follower pin (3) that engages with a first cam groove formed at the cam cylinder (20), and the second movement group includes a second cam follower pin (2) that penetrates a second straight groove formed at the (Continued)

fixed cylinder (30) and a second cam groove formed at the cam cylinder (20) and that engages with the first straight groove (4).

12 Claims, 14 Drawing Sheets

(58) Field of Classification Search
USPC ......................................................... 359/676
See application file for complete search history.

(56) References Cited

U.S. PATENT DOCUMENTS

| | | | | |
|---|---|---|---|---|
| 2011/0038058 A1* | 2/2011 | Fukai | ...................... | G03B 17/04 |
| | | | | 359/700 |
| 2011/0102921 A1* | 5/2011 | Sato | ......................... | G02B 7/10 |
| | | | | 359/823 |
| 2014/0253793 A1* | 9/2014 | Kang | ...................... | G02B 7/102 |
| | | | | 359/823 |
| 2016/0054539 A1 | 2/2016 | Matsumoto et al. | | |
| 2018/0113271 A1 | 4/2018 | Kamio et al. | | |

FOREIGN PATENT DOCUMENTS

| | | | |
|---|---|---|---|
| JP | 2006-284865 | A | 10/2006 |
| JP | 2007-264220 | A | 10/2007 |
| WO | 2016/104547 | A1 | 6/2016 |

OTHER PUBLICATIONS

International Preliminary Report On Patentability (Chapter I) and Written Opinion of the International Searching Authority issued in PCT/JP2021/027445; issued Jan. 31, 2023.

* cited by examiner

ZOOM LENS DEVICE AND OPTICAL DEVICE

CROSS-REFERENCE TO RELATED APPLICATIONS

The present application is a Continuation of PCT International Application No. PCT/JP2021/027446 filed on Jul. 26, 2021 claiming priority under 35 U.S.c §119(a) to Japanese Patent Application No. 2020-130635 filed on Jul. 31, 2020. Each of the above applications is hereby expressly incorporated by reference, in its entirety, into the present application.

BACKGROUND OF THE INVENTION

1. Field of the Invention

The present invention relates to a zoom lens device and an optical device.

2. Description of the Related Art

In the related art, a technique related to movement of a movement group that moves in the case of a magnification change operation in a zoom lens device has been proposed.

Disclosed in WO2016/104547A is a zoom lens device in which two protrusion portions are separately formed on a first linear movement cylinder and two straight grooves that respectively engage with the two protrusion portions are formed on a fixed cylinder so that the length of a portion where the fixed cylinder and the first linear movement cylinder engage with each other is increased, the fixed cylinder and the first linear movement cylinder moving relative to each other.

SUMMARY OF THE INVENTION

An embodiment of the present disclosed technology provides a zoom lens device and an optical device with which it is possible to increase a moving distance of a moving cylinder in an optical axis direction without an increase in number of components, the moving cylinder including a lens group closest to a subject side.

A zoom lens device according to an aspect of the present invention includes a fixed cylinder, a cam cylinder that is positioned outside the fixed cylinder, a first movement group that is positioned outside the cam cylinder and that includes a first lens group provided at a distal end portion, and a second movement group that is positioned inside the fixed cylinder and that includes a second lens group. The first movement group and the second movement group move so that a magnification change operation is performed in a case where the cam cylinder rotates, the first movement group includes a first straight groove that guides the first movement group straight and a first cam follower pin that engages with a first cam groove formed at the cam cylinder, and the second movement group includes a second cam follower pin that penetrates a second straight groove formed at the fixed cylinder and a second cam groove formed at the cam cylinder and that engages with the first straight groove.

A zoom lens device according to another aspect of the present invention includes a fixed cylinder, a cam cylinder that is positioned outside the fixed cylinder, a first movement group that is positioned outside the cam cylinder and that includes a first lens group provided at a distal end portion, and a second movement group that is positioned inside the fixed cylinder and that includes a second lens group. The first movement group and the second movement group move so that a magnification change operation is performed in a case where the cam cylinder rotates, the first movement group includes a first straight groove that guides the first movement group straight and a first cam follower pin that engages with a first cam groove formed at the cam cylinder, and the second movement group includes a second cam follower pin that engages with the first straight groove of the first movement group via the fixed cylinder and the cam cylinder and a third cam follower pin that engages with a second straight groove formed at the fixed cylinder and a second cam groove formed at the cam cylinder.

It is preferable that the first straight groove is formed at an inner peripheral surface of the first movement group.

It is preferable that the first movement group includes one or more first straight grooves in a circumferential direction.

It is preferable that the first cam follower pin engages only with the first cam groove.

It is preferable that the cam cylinder includes a third cam groove that engages with a fourth cam follower pin provided at the fixed cylinder and the cam cylinder rotates to move in an optical axis direction with respect to the fixed cylinder.

An optical device according to still another aspect of the present invention includes the zoom lens device described above.

BRIEF DESCRIPTION OF THE DRAWINGS

FIG. 14 is a view showing the position of a lock ring in the case of the zoom unlocking operation.

FIG. 16 is a view showing the position of the lock ring in the case of the zoom locking operation.

DESCRIPTION OF THE PREFERRED EMBODIMENTS

First Embodiment

Hereinafter, preferred embodiments of a zoom lens device and an optical device according to the present invention will be described with reference to the accompanying drawings.

First, the related art will be described.

To be considered below is movement of a first movement group including a first lens group closest to a subject side that is made in a direction along an optical axis in a case where a magnification change operation of a zoom lens device is performed. In many cases, restriction of rotation of the first lens group and the first movement group, which includes a moving cylinder that moves integrally with the first lens group, is performed by means of a cam follower pin provided at the moving cylinder and a straight groove of a fixed cylinder. Specifically, the cam follower pin formed at the moving cylinder engages with a cam groove of a cam cylinder so that a drive force is applied to the first movement group and the cam follower pin engages with the straight groove of the fixed cylinder so that rotation of the first movement group is restricted. However, in a case where the rotation of the first movement group is restricted by means of the straight groove of the fixed cylinder in such a manner, the required length of the straight groove exceeds the length of the fixed cylinder in a case where the amount of movement of the first movement group is large, so that restriction of rotation of the first movement group cannot be performed. As a technique for solving this problem, there is also a technique of providing another set of a cam cylinder and a straight groove. However, the number of components of the zoom lens device increases and thus there is an increase in cost. In addition, there is a problem that the component cumulative error increases.

Therefore, in the present embodiment, in order to solve these problems, restriction of rotation of a first movement group is performed by means of a straight groove formed at a moving cylinder, which is a part of the first movement group, and a cam follower pin formed at a second movement group different from the first movement group. Hereinafter, the present embodiment will be described.

The configuration of the zoom lens device will be described with reference to FIGS. 1 to 3.

Figure 1:
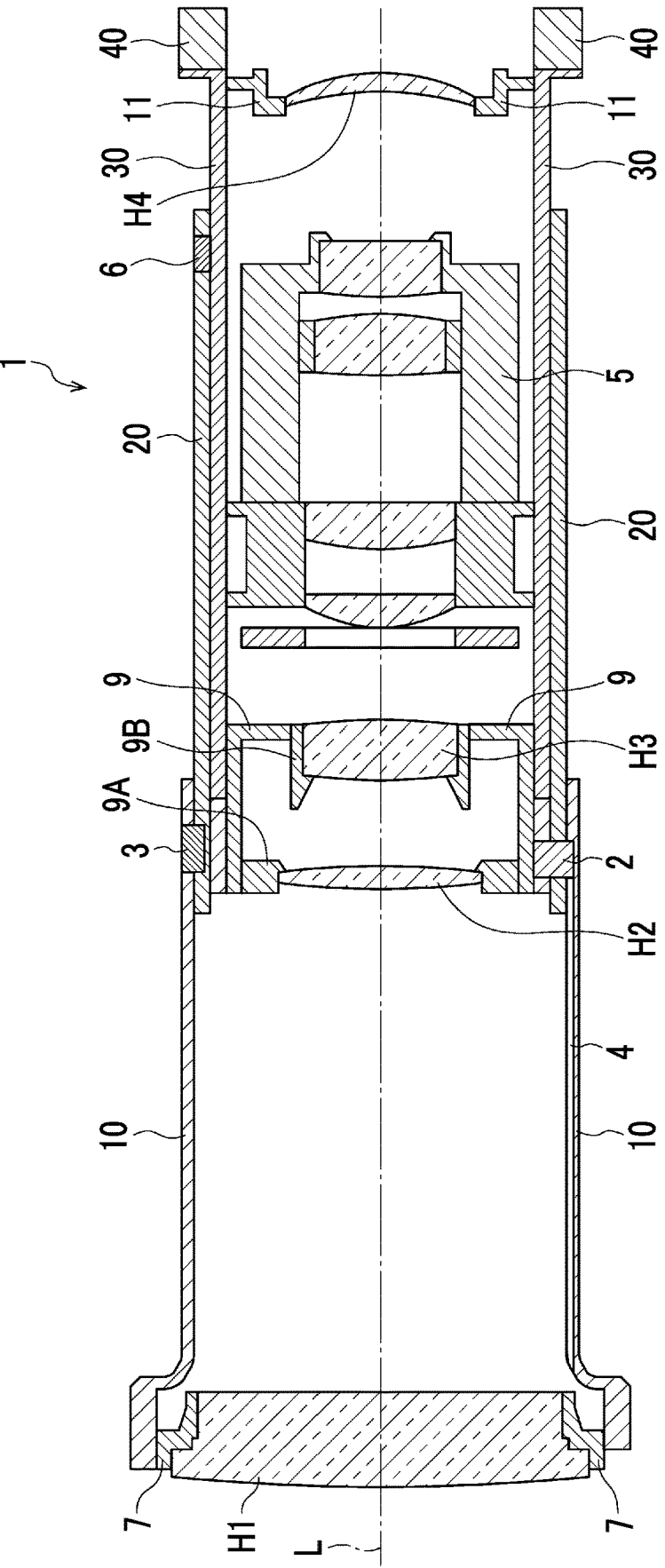
FIG. 1 is a cross-sectional view of a main part of a zoom lens device in the case of a magnification change operation.
Figure 2:
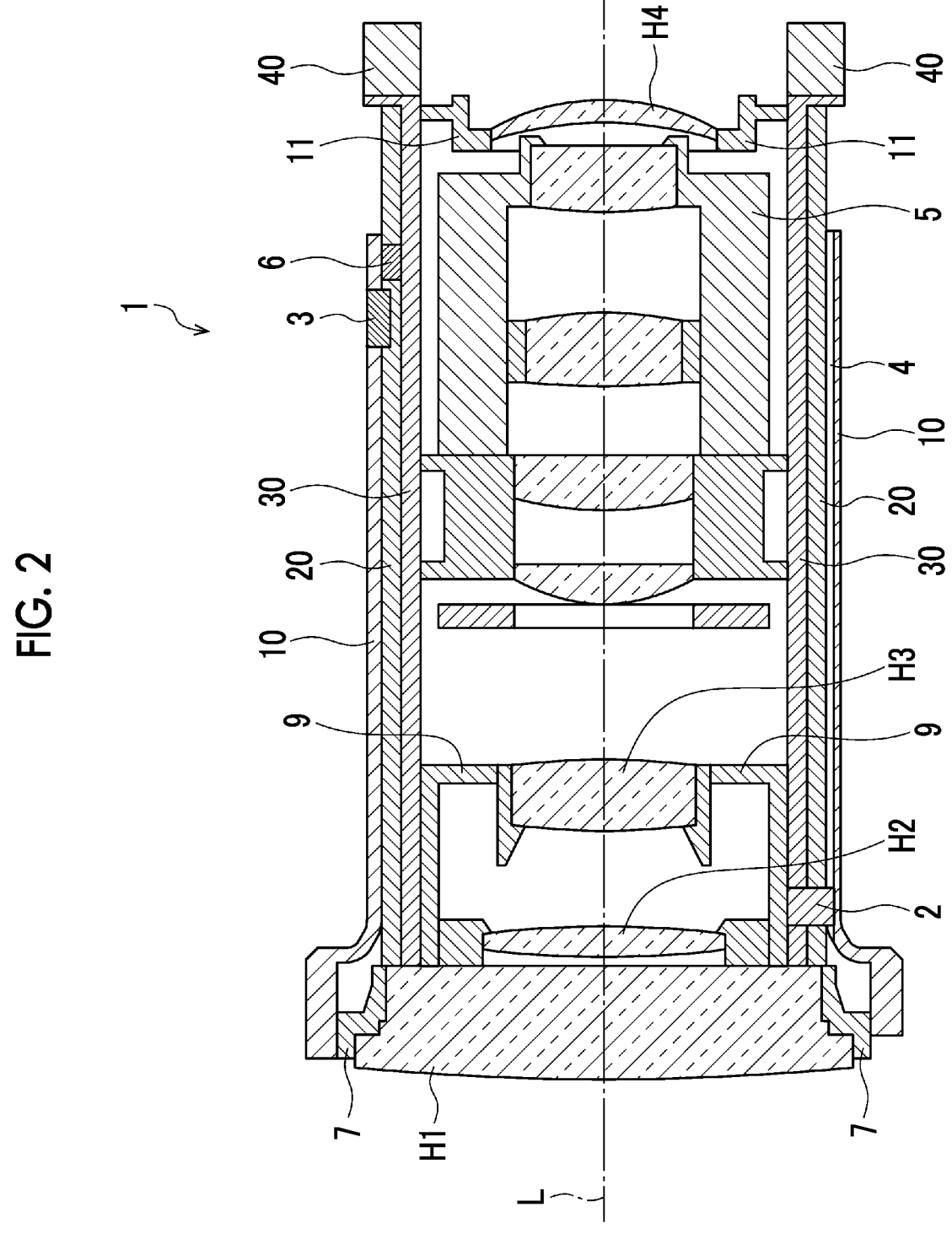
FIG. 2 is a cross-sectional views of the main part of the zoom lens device in the case of the magnification change operation.

FIG. 1 and FIG. 2 are cross-sectional views of a main part of the zoom lens device in the case of a magnification change operation.

FIG. 1 is a cross-sectional view of a zoom lens device 1 in a telephoto end state and FIG. 2 is a cross-sectional view of the zoom lens device 1 in a wide angle end state. FIG. 3 is a perspective view of a moving cylinder, a cam cylinder, and a fixed cylinder in the case of the magnification change operation of the zoom lens device 1. Note that, an optical axis L of lens groups of the zoom lens device 1 is shown in FIGS. 1 to 3. In addition, in FIGS. 1 to 3, a part of the zoom lens device 1 that is directly related to the present embodiment is shown and the other portions are not shown. For example, in FIG. 1 and FIG. 2, a stop and the like are not shown.

The zoom lens device 1 includes a moving cylinder 10, a cam cylinder 20, and a fixed cylinder 30 arranged in this order from the outside.

The moving cylinder 10 includes a first lens holding portion 7, a first lens group H1, a first cam follower pin 3, and a first straight groove 4. Here, the moving cylinder 10, the first lens holding portion 7, the first lens group H1, the first cam follower pin 3, and the first straight groove 4 constitute a first movement group that integrally moves in a direction along the optical axis L.

The moving cylinder 10 is positioned outside the cam cylinder 20 and includes the first lens holding portion 7 provided on a distal end side, which is a subject side. The first lens holding portion 7 holds the first lens group H1. The moving cylinder 10 includes the first cam follower pin 3 provided on a rear end side. The first cam follower pin 3 protrudes from an inner peripheral surface of the moving cylinder 10 and engages with a first cam groove 22 (refer to FIG. 3) of the cam cylinder 20. Note that, as described above, in the related art, the first cam follower pin 3 also engages with a straight groove formed at the fixed cylinder 30 so that restriction of rotation of the first movement group is performed. However, the first cam follower pin 3 of the present embodiment engages only with the first cam groove 22 of the cam cylinder 20 and a straight groove for the first movement group is not formed at the fixed cylinder 30.

At the inner peripheral surface of the moving cylinder 10, the first straight groove 4 for the first movement group, which does not penetrate the inner peripheral surface, is formed. The first straight groove 4 is formed to extend in a linear shape connecting a proximal end portion side and a distal end portion side of the moving cylinder 10 in the direction along the optical axis L. The first straight groove 4 has, for example, a recessed shape and engages with a second cam follower pin 2 that has a protruding shape. In a case where the first movement group including the moving cylinder 10 moves, the moving cylinder 10 moves in the direction along the optical axis L with the second cam follower pin 2 abutting against and sliding on the first straight groove 4. Note that, one or more first cam follower pins 3 and one or more first straight grooves 4 may be provided in a circumferential direction of the moving cylinder 10 and it is preferable that three first cam follower pins 3 and three first straight grooves 4 are formed at equal intervals in the circumferential direction. In addition, the number of second cam follower pins 2 formed is the same as the number of first straight grooves 4 formed.

The moving cylinder 10 moves in the direction along the optical axis L with the cam cylinder 20 rotating around the optical axis L. Specifically, the first cam follower pin 3 formed at the moving cylinder 10 engages with the first cam groove 22 (FIG. 3) of the cam cylinder 20. Therefore, in a case where the cam cylinder 20 rotates, the first cam follower pin 3 is driven and the moving cylinder 10 moves in a front-rear direction along the optical axis L. Here, in the case of movement in the direction along the optical axis L, a rotational force acts on the moving cylinder 10 with the first cam follower pin 3 being driven. However, since the first straight groove 4 engages with the second cam follower pin 2, rotation of the moving cylinder 10 is restricted and the moving cylinder 10 is guided straight.

Figure 3:
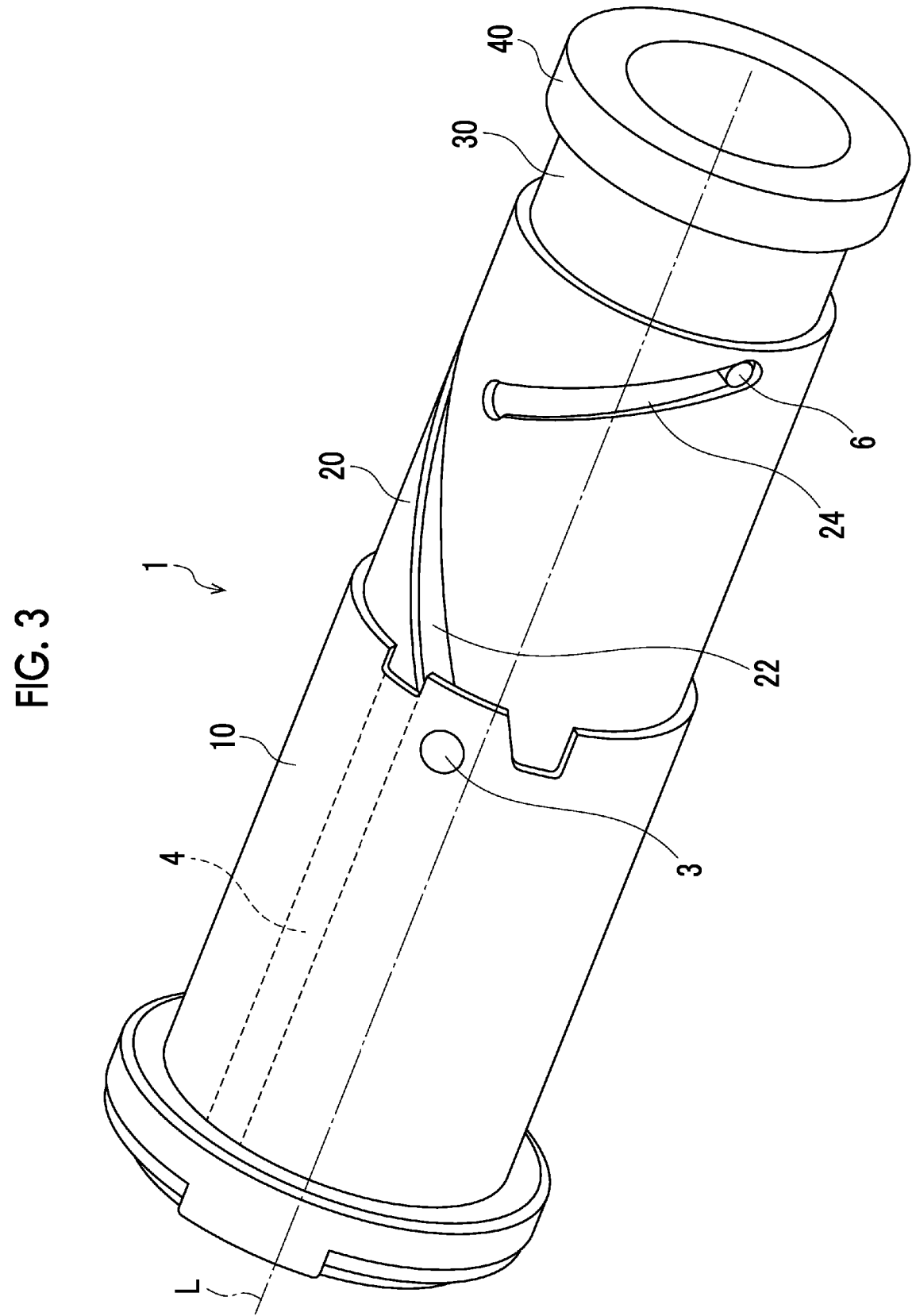
FIG. 3 is a perspective view of the main part moving in the case of the magnification change operation of the zoom lens device.

The cam cylinder 20 includes at least the first cam groove 22, a second cam groove 24, and a third cam groove 26 (refer to FIG. 3 (note that, the third cam groove 26 is not shown in FIG. 3)). The first cam groove 22 engages with the first cam follower pin 3 formed at the moving cylinder 10. The second cam groove 24 engages with a fixation cam follower pin 6 (a fourth cam follower pin) formed at the fixed cylinder 30. The third cam groove 26 engages with the second cam follower pin 2 formed at a base frame 9.

The cam cylinder 20 rotates around the optical axis L. In a case where the cam cylinder 20 rotates, the first cam follower pin 3 engaging with the first cam groove 22 is guided in the direction along the optical axis L and the circumferential direction. In addition, in a case where the cam cylinder 20 rotates, the cam cylinder 20 is guided with respect to the fixed cylinder 30 in the direction along the optical axis L and the circumferential direction because of the action of the fixation cam follower pin 6 and the second cam groove 24 engaging with each other.

The fixed cylinder 30 includes the base frame 9, a focus unit 5, a proximal end portion lens holding portion 11, and the fixation cam follower pin 6. The base frame 9 includes a second lens holding portion 9A, a third lens holding portion 9B, and the second cam follower pin 2. The base frame 9, the second lens holding portion 9A, the third lens holding portion 9B, and the second cam follower pin 2 constitute a second movement group. The second lens holding portion 9A holds a second lens group H2 and the third lens holding portion 9B holds a third lens group H3. In addition, the second cam follower pin 2 that engages with the first straight groove 4 is formed on a distal end side of the base frame 9.

The focus unit 5 includes a focus lens group and adjusts the focus of a subject image by moving the focus lens group along the optical axis L. Note that a detailed description of the focus unit 5 will be omitted.

The proximal end portion lens holding portion 11 includes a proximal end portion lens group H4. In addition, a proximal end side of the fixed cylinder 30 is fixed by a base member 40. A mount (not shown) is integrally attached to the base member 40 and is attached to a main body (the optical device). Note that the zoom lens device 1 can be attached to various optical devices. For example, examples of the optical device to which the zoom lens device 1 is attached include a binocle, a microscope, an interchangeable lens camera, and an integrated-lens camera.

The fixation cam follower pin 6 is formed to protrude from the fixed cylinder 30 and engages with the second cam groove 24 formed at the cam cylinder 20. In a case where the cam cylinder 20 rotates around the optical axis L, the cam cylinder 20 moves forward and backward with respect to the fixed cylinder 30 along the optical axis L.

Figure 4:
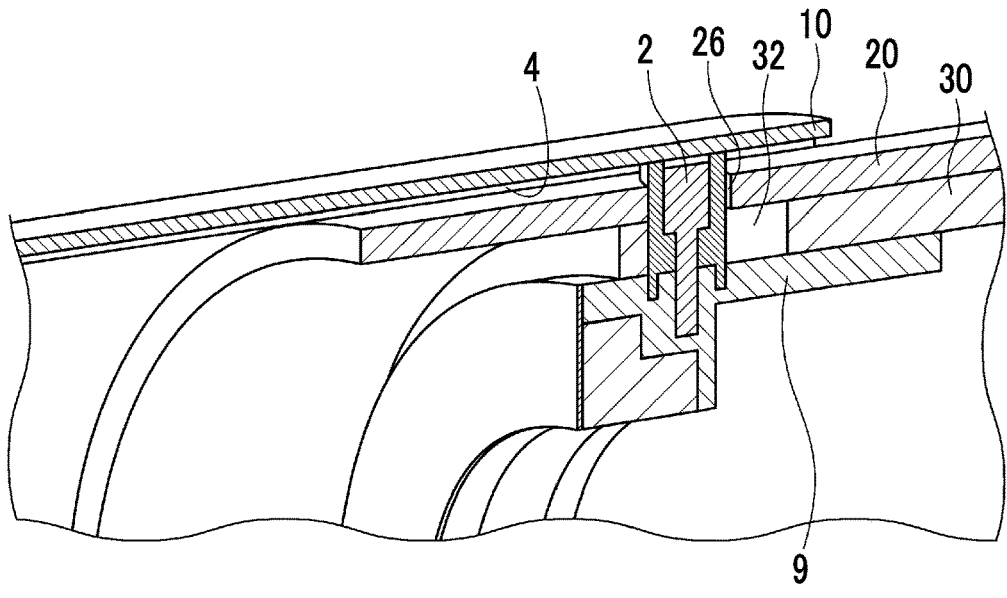
FIG. 4 is a perspective sectional view showing a second cam follower pin.
Figure 5:
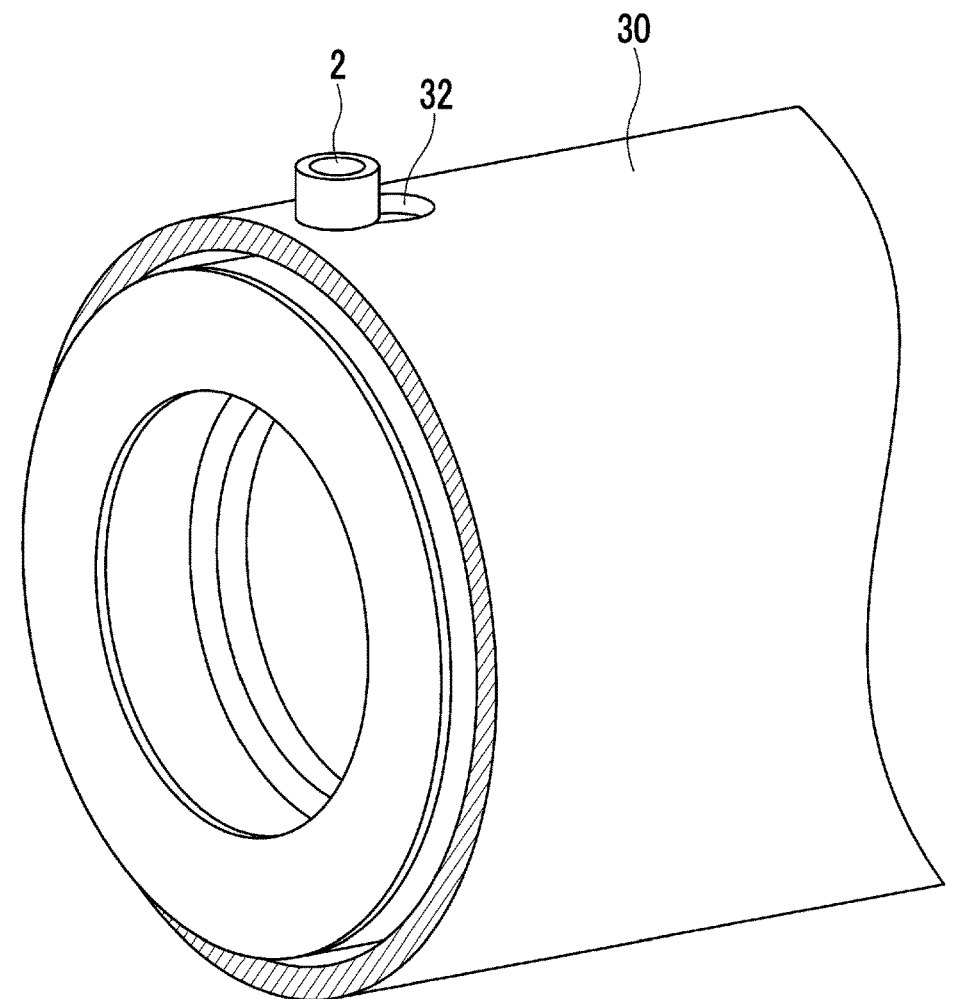
FIG. 5 is a view showing a second straight groove provided at a fixed cylinder and the second cam follower pin engaging with the second straight groove.

Next, the second cam follower pin 2 of the present embodiment will be described with reference to FIGS. 4 and 5. FIG. 4 is a perspective sectional view showing the second cam follower pin 2 of the present embodiment. In addition, FIG. 5 is a view showing a second straight groove 32 provided at the fixed cylinder 30 and the second cam follower pin 2 engaging with the second straight groove 32.

The second cam follower pin 2 of the present embodiment penetrates the fixed cylinder 30 and the cam cylinder 20. Specifically, the second cam follower pin 2 engages with and penetrates the second straight groove 32 for the second movement group that is provided at the fixed cylinder 30 and the second cam follower pin 2 engages with and penetrates the third cam groove 26 provided at the cam cylinder 20. In addition, the second cam follower pin 2 penetrating the cam cylinder 20 engages with the first straight groove 4 formed at the moving cylinder 10.

The second cam follower pin 2 engages with the first straight groove 4, restricts rotation of the moving cylinder 10, and guides the moving cylinder 10 straight along the optical axis L.

In addition, since the second cam follower pin 2 engages with the third cam groove 26 formed at the cam cylinder 20 and engages with the second straight groove 32 formed at the fixed cylinder 30, the second cam follower pin 2 is driven along the optical axis L in a case where the cam cylinder 20 rotates around the optical axis L. Accordingly, the second movement group including the base frame 9 moves along the optical axis L.

As described above, in the present embodiment, the first straight groove 4 for guiding the first movement group straight is formed at the moving cylinder 10 included in the first movement group. In addition, the second cam follower pin 2 formed at the base frame 9 included in the second movement group penetrates the fixed cylinder 30 and the cam cylinder 20 and engages with the first straight groove 4. Therefore, restriction of rotation of the moving cylinder 10 is performed by means of the first straight groove 4 and the second cam follower pin 2. Accordingly, a moving distance of the moving cylinder 10 in the direction along the optical axis L can be made large regardless of the length of the fixed cylinder 30. In addition, according to the present embodiment, a cam cylinder does not need to be added to form a long straight groove, so that it is possible to make the number of components of the zoom lens device 1 small.

Furthermore, in the present embodiment, the second cam follower pin 2 engages with the first straight groove 4, engages with the second straight groove 32 formed at the fixed cylinder 30, and engages with the third cam groove 26 formed at the cam cylinder 20. Therefore, the second cam follower pin 2 guides the moving cylinder 10 straight and is driven in the direction along the optical axis L of the second movement group. Accordingly, it is possible to make the number of components of the zoom lens device 1 small in comparison with a case where a cam follower pin that engages with the first straight groove 4 and a cam follower pin that engages with the third cam groove 26 and the second straight groove 32 are formed.

Second Embodiment

Next, a second embodiment will be described. In the present embodiment, as with the first embodiment, the second cam follower pin 2 guides the moving cylinder 10 straight. Furthermore, in the present embodiment, a third cam follower pin 8 is formed and the third cam follower pin 8 guides the second movement group straight.

Figure 6:
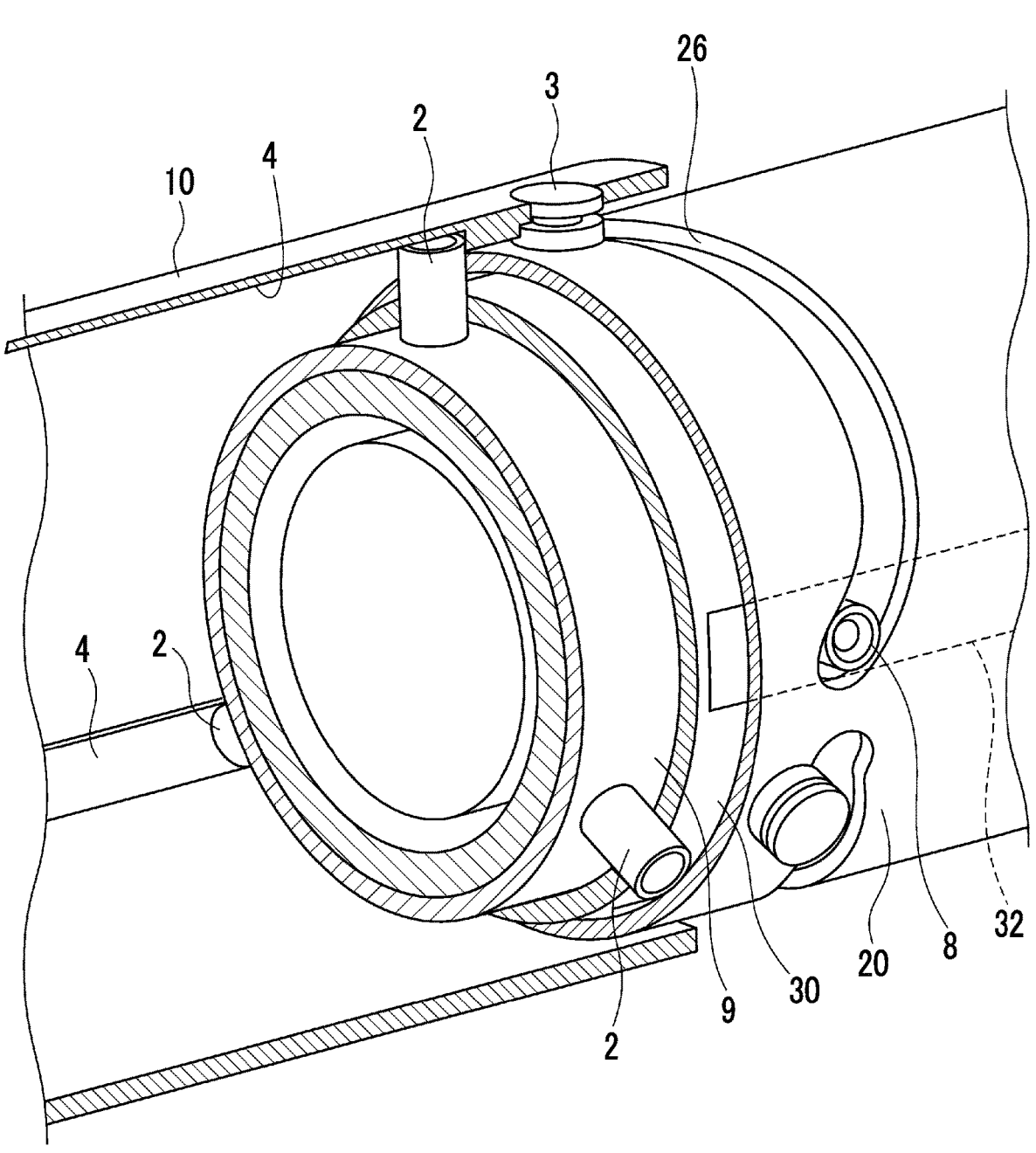
FIG. 6 is a perspective sectional view showing the second cam follower pins and a third cam follower pin.
Figure 7:
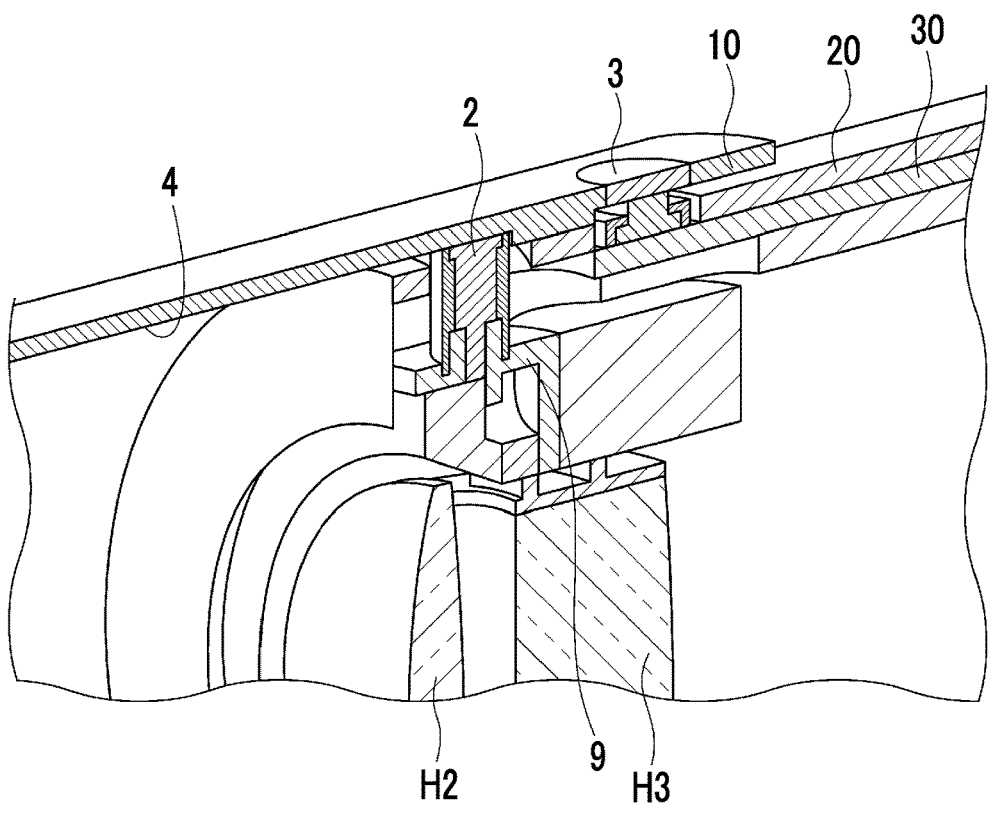
FIG. 7 is a perspective sectional view showing the second cam follower pin.

Next, the second cam follower pin 2 and the third cam follower pin 8 of the present embodiment will be described with reference to FIGS. 6 and 7. FIG. 6 is a perspective sectional view showing the second cam follower pins 2 and the third cam follower pin 8. Note that, in FIG. 6, the first cam groove 22 with which the first cam follower pin 3 engages is not shown. FIG. 7 is a perspective sectional view showing the second cam follower pin 2. Note that, in FIG. 7, the second lens holding portion 9A is not shown.

The second cam follower pins 2 and the third cam follower pin 8 are formed at the base frame 9.

The second cam follower pins 2 engage with the first straight grooves 4 formed at the moving cylinder 10 via the fixed cylinder 30 and the cam cylinder 20. Specifically, the second cam follower pins 2 penetrate the fixed cylinder 30 and the cam cylinder 20 and engage with the first straight grooves 4 without abutting against and engaging with the fixed cylinder 30 and the cam cylinder 20. In addition, in a case as shown in FIG. 6, three second cam follower pins 2 are provided at equal intervals in the circumferential direction.

In addition, in the present embodiment, the third cam follower pin 8 is formed at the base frame 9. The third cam follower pin 8 engages with the second straight groove 32 formed at the fixed cylinder 30. In addition, the third cam follower pin 8 penetrates the fixed cylinder 30 and engages with the third cam groove 26 formed at the cam cylinder 20. Accordingly, the third cam follower pin 8 is driven in the circumferential direction and the direction along the optical axis L and the second movement group is moved in a case where the cam cylinder 20 rotates around the optical axis L. Note that, as with the second cam follower pins 2, three third cam follower pins 8 may be provided at equal intervals in the circumferential direction.

As described above, in the present embodiment, the first straight grooves 4 for guiding the first movement group straight are formed at the moving cylinder 10 included in the first movement group. In addition, the second cam follower pins 2 formed at the base frame 9 included in the second movement group penetrate the fixed cylinder 30 and the cam cylinder 20 and engage with the first straight grooves 4. Therefore, restriction of rotation of the moving cylinder 10 is performed by means of the first straight groove 4 and the second cam follower pin 2. Accordingly, a moving distance of the moving cylinder 10 in the direction along the optical axis L can be made large regardless of the length of the fixed cylinder 30. In addition, according to the present embodiment, a cam cylinder and a linear movement cylinder do not need to be added to form a long straight groove, so that it is possible to make the number of components of the zoom lens device 1 small.

Furthermore, in the present embodiment, movement of the second movement group in the direction along the optical axis L is performed in a case where the third cam follower pin 8 separated from the second cam follower pins 2 is driven. Accordingly, a function for movement in the magnification change operation can be distributed to the second cam follower pins 2 and the third cam follower pin 8.

<Example of Cam Follower Pin>

Next, a specific example of the above-described second cam follower pin 2 will be described. Regarding the above-described the second cam follower pin 2, various forms can be adopted as long as the second cam follower pin 2 can engage with the first straight groove 4 and restrict rotation of the moving cylinder 10. Hereinafter, a specific example of the second cam follower pin 2 will be described with reference to FIG. 8.

Figure 8:
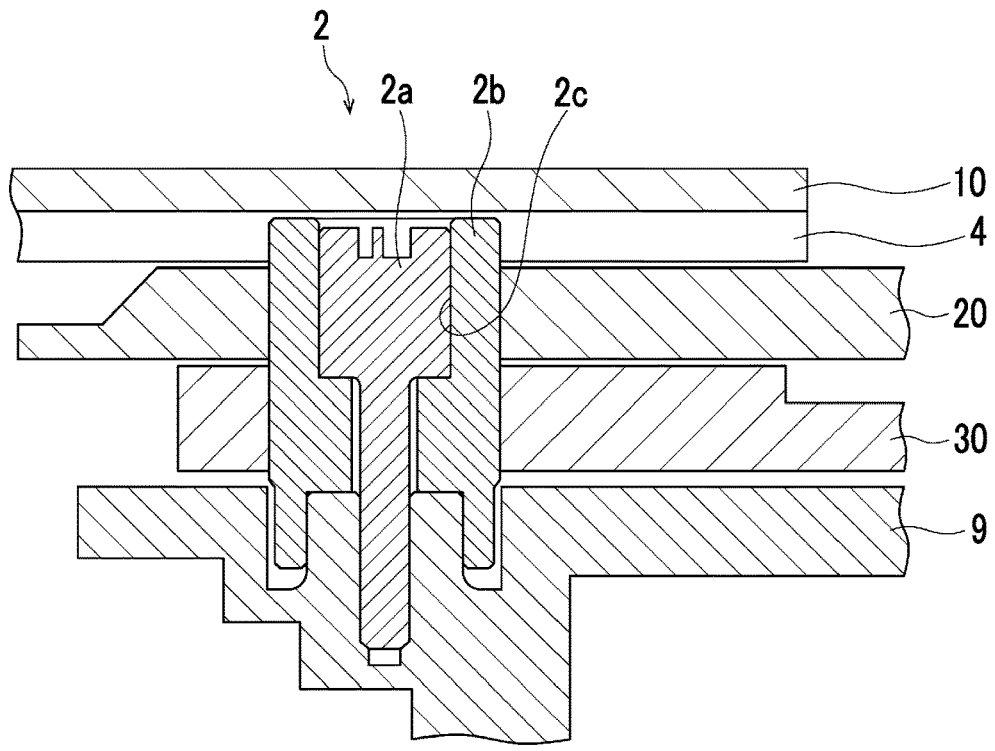
FIG. 8 is a view showing one of specific examples of the second cam follower pin.

FIG. 8 is a view showing one of specific examples of the second cam follower pin 2.

The second cam follower pin 2 is composed of a screw 2a and a pin shaft portion 2b. The pin shaft portion 2b has a hollow columnar shape and includes a hollow portion 2c extending along an axis. The hollow portion 2c functions as an insertion portion for the screw 2a in a case where the screw 2a is attached to the base frame 9. An upper portion of the pin shaft portion 2b abuts against the first straight groove 4 of the moving cylinder 10 and slides on the first straight groove 4 in a case where the moving cylinder 10 moves. Therefore, the pin shaft portion 2b is formed of a material that is slidable with respect to the first straight groove 4. The second cam follower pin 2 slides on the first straight groove 4 so that rotation of the moving cylinder 10 is restricted. Accordingly, the second cam follower pin 2 guides the first movement group straight, the first movement group including the moving cylinder 10.

<Appendix>

The following appendix will be disclosed in relation to the zoom lens device 1 described above.

In the related art, regarding a zoom lens device, a technique in which rotation of a zoom ring is restricted and a zoom locking operation is performed in a state where a lens is moved to a WIDE end for the purpose of improving convenience in carrying a zoom lens device is known.

In recent years, the angle of a cam groove has become sharper with reduction in diameter of a lens barrel. In addition, in the case of a design in which a feeding amount of a first movement group positioned closest to a subject side is large, the angle of the cam groove needs to be sharp. In a case where the angle of the cam groove is sharp as described above, a lens barrel is likely to fall because of the own weight thereof. Here, falling because of the own weight thereof means an unintentional magnification change operation performed because of the weight of a zoom lens device. In the case of an imaging operation performed by means of a lens barrel that is likely to fall because of the own weight thereof, there is a problem that the angle of view is unintentionally changed because of the influence of the posture of a lens and the ambient temperature of the lens at the time of the imaging operation even after a photographer determines the angle of view.

The technology disclosed below has been made in view of such circumstances and an object thereof is to provide a locking mechanism of a zoom lens device, a zoom lens device, and an optical device of which an object is to prevent falling because of the own weight thereof by performing a zoom locking operation at any magnification.

The following aspects (means) are disclosed for achievement of the above-described object.

According to a first aspect, there is provided a locking mechanism for a zoom lens device according to a first aspect including:

a lock ring that is provided adjacent to a zoom ring and that is moved in an optical axis direction by being rotationally operated, the zoom ring rotating a cam cylinder of the zoom lens device;

a linear movement ring that engages with the lock ring and that moves only in the optical axis direction as the lock ring moves in the optical axis direction; and a stopper that is fixed to the linear movement ring, that abuts against the zoom ring or a rotary member rotating together with the zoom ring, and that is formed of an elastic body, in which the linear movement ring moves in a direction toward the zoom ring and the stopper abuts against the zoom ring or the rotary member so that the zoom ring is fixed in a case where the lock ring is rotationally operated in a lock direction.

According to a second aspect, in the locking mechanism related to the first aspect, the stopper is preferably formed of rubber.

According to a third aspect, in the locking mechanism related to the first aspect or the second aspect, the stopper in the first aspect has a plate-like shape.

According to a fourth aspect, in the locking mechanism related to any one of the first to third aspects, the stopper abuts against the zoom ring or a shoulder-shaped abutting portion of the rotary member.

According to a fifth aspect, in the locking mechanism related to any one of the first to fourth aspects, the lock ring includes a cam cylinder that includes a cam groove engaging with a fixed pin and that engages with the linear movement ring, the cam cylinder is rotationally interlocked with the lock ring and moves together with the lock ring in the optical axis direction, and the linear movement ring moves as the cam cylinder moves.

According to a sixth aspect, there is provided a zoom lens device including the locking mechanism for a zoom lens device related to any one of the first to fifth aspects, According to a seventh aspect, there is provided an optical device including the zoom lens device related to the sixth aspect. Here, examples of the optical device include a binocle, a microscope, an interchangeable lens camera, and an integrated-lens camera.

[Overall Configuration of Lens Barrel]

Here, a case where the present disclosed technology is applied to an interchangeable lens of an interchangeable lens camera will be described as an example.

Figure 9:
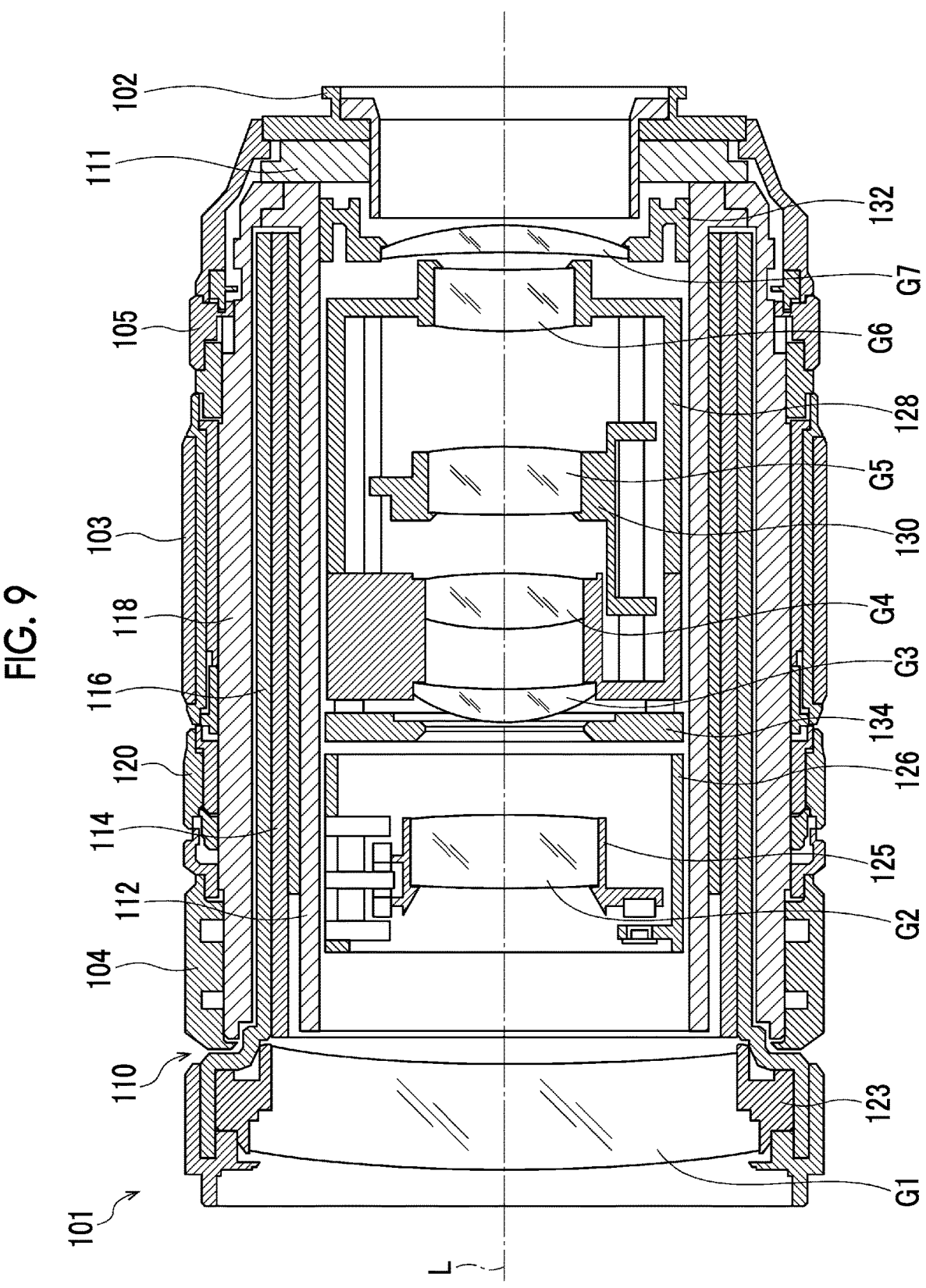
FIG. 9 is a cross-sectional view showing a schematic internal configuration of an interchangeable lens.

FIG. 9 is a cross-sectional view showing a schematic internal configuration of an interchangeable lens of the present embodiment.

An interchangeable lens 101 (corresponding to the zoom lens device 1 described above) shown in the drawing is an interchangeable lens for a digital still camera including a focus mechanism, a zoom mechanism, and an optical image stabilizer (OIS). The interchangeable lens 101 is attachably and detachably mounted to a camera body (not shown) via a mount 102 provided at a proximal end portion.

As shown in FIG. 9, a lens barrel 110 of the interchangeable lens 101 of the present embodiment includes a first fixed cylinder 112, a cam cylinder 114, a moving cylinder 116, and a second fixed cylinder 118 arranged in this order from an inner side.

The first fixed cylinder 112 and the second fixed cylinder 118 are fixed members with respect to the mount 102. Both of the first fixed cylinder 112 and the second fixed cylinder 118 are fixed to a base member 111 on a proximal end portion side (an image side). The mount 102 is integrally attached to the base member 111.

The cam cylinder 114 is a member that rotates around the first fixed cylinder 112 in a circumferential direction. The cam cylinder 114 is rotated in a case where a zoom ring 103 is rotationally operated. That is, the cam cylinder 114 is manually rotated. The zoom ring 103 is provided outside the second fixed cylinder 118 and is connected to the cam cylinder 114 via a connecting member (not shown). Note that, in addition to the zoom ring 103, a lock ring 120, a focus ring 104, a stop ring 105, and the like are provided outside the second fixed cylinder 118. Note that a zoom locking mechanism including the lock ring 120 will be described later.

The moving cylinder 116 is a member that moves at an inner peripheral portion of the second fixed cylinder 118 along the optical axis L. In a case where the cam cylinder 114 is rotated, the moving cylinder 116 is moved forward and backward along the optical axis L by a cam mechanism (not shown).

Inside the lens barrel 110, a first lens group G1, a second lens group G2, a third lens group G3, a fourth lens group G4, a fifth lens group G5, a sixth lens group G6, and a seventh lens group G7 are provided in this order from an object side (the left side in FIG. 9) along the optical axis L. A stop is provided between the second lens group G2 and the third lens group G3. Each lens group is composed of at least one lens. The first lens group G1 to the sixth lens group G6 are lens groups that move in the case of zooming. The seventh lens group G7 is a lens group fixed in the case of zooming.

The first lens group G1 is held by a first lens group holding frame 123. The first lens group holding frame 123 is held by being fixed to a distal end of the moving cylinder 116. Therefore, the first lens group holding frame 123 is moved as the moving cylinder 116 moves.

The second lens group G2 is a lens group that constitutes a shake-correction lens. The second lens group G2 is held by a movable frame 125. The movable frame 125 is held to be movable in a plane orthogonal to the optical axis L with respect to a base frame 126. The base frame 126 is held to be movable along the optical axis L inside the first fixed cylinder 112. In a case where the cam cylinder 114 is rotated, the base frame 126 is moved forward and backward along the optical axis L by a cam mechanism (not shown).

The third lens group G3 to the sixth lens group G6 are held by a moving lens frame 128. The moving lens frame 128 is held to be movable along the optical axis L inside the first fixed cylinder 112. In a case where the cam cylinder 114 is rotated, the moving lens frame 128 is moved forward and backward along the optical axis L by a cam mechanism (not shown).

Here, the third lens group G3, the fourth lens group G4, and the sixth lens group G6 are held by being fixed to the moving lens frame 128.

Meanwhile, the fifth lens group G5 is held to be movable along the optical axis L with respect to the moving lens frame 128. The fifth lens group G5 is a lens group that constitutes a focus lens and focus adjustment is performed by moving the fifth lens group G5 forward and backward along the optical axis L. The fifth lens group G5 is held by a focus lens frame 130 and supported to be movable along the optical axis L. In addition, the fifth lens group G5 is moved by being driven by an actuator provided at the moving lens frame 128.

The seventh lens group G7 is held by a seventh lens group holding frame 132. The seventh lens group holding frame 132 is held by being fixed to a proximal end portion of the first fixed cylinder 112.

Regarding a stop, a stop unit 134 including the drive mechanism therefor is integrally attached to a distal end portion of the moving lens frame 128 and is disposed at a predetermined position.

[Configuration of Zoom Locking Mechanism]

Next, the configuration of the zoom locking mechanism will be described.

The zoom locking mechanism is mainly composed of the lock ring 120, a lock ring cam cylinder 120A, a linear movement ring 122, a sliding ring 124, and the zoom ring 103. Note that the lock ring cam cylinder 120A may be a part of the lock ring 120 and the sliding ring 124 may be a part of the zoom ring 103. That is, the lock ring cam cylinder 120A and the lock ring 120 may be integrated with each other and the sliding ring 124 and the zoom ring 103 may be integrated with each other. The zoom locking mechanism is provided between the focus ring 104 and the stop ring 105. In the zoom locking mechanism, a switch between a zoom locking operation and a zoom unlocking operation is performed in a case where the lock ring 120 (refer to FIG. 9) is rotationally operated and is moved forward and backward along the optical axis L.

Figure 10:
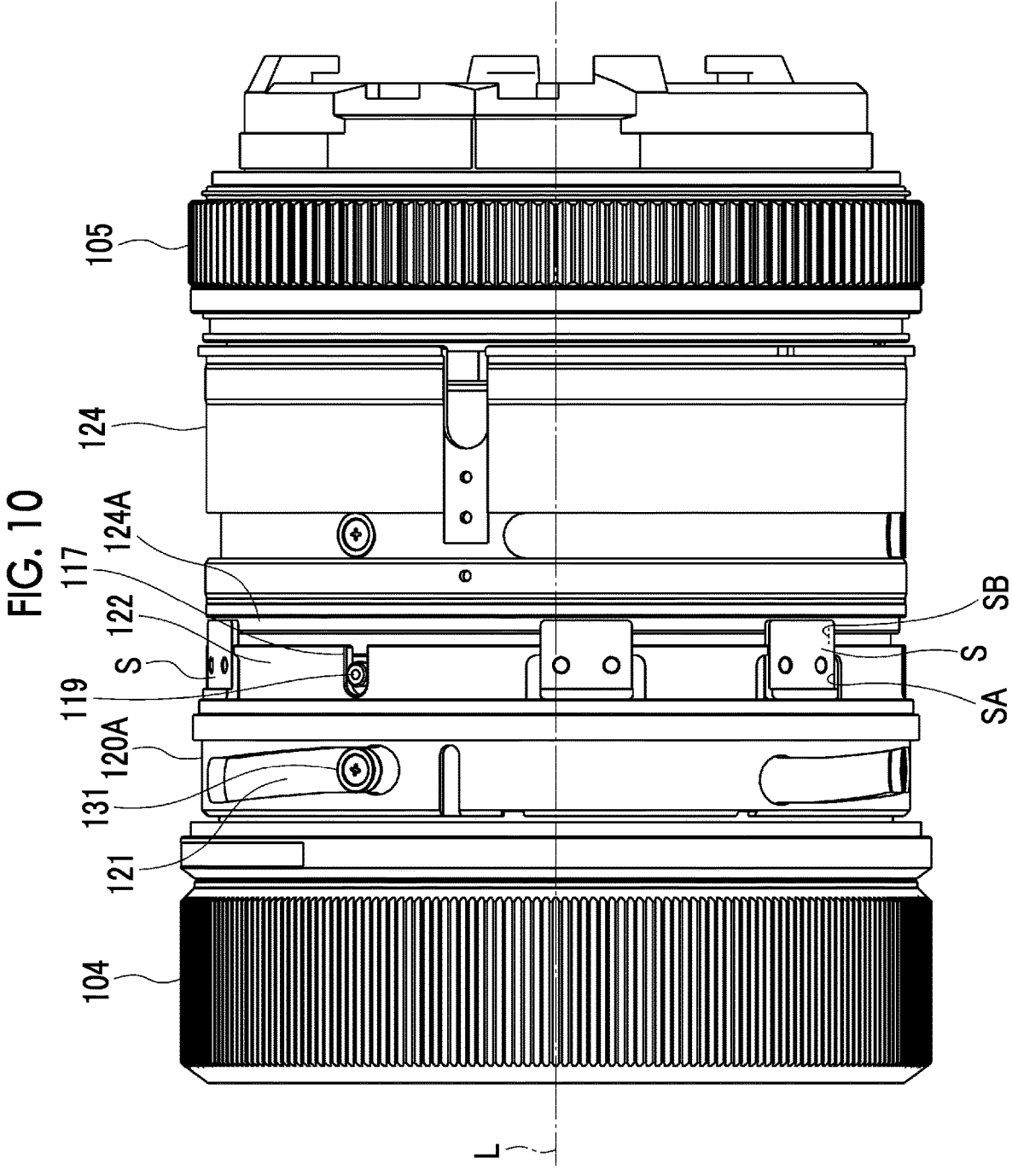
FIG. 10 is a view showing the configuration of a zoom locking mechanism.

FIG. 10 is a view showing the configuration of the zoom locking mechanism provided between the focus ring 104 and the stop ring 105 of the lens barrel 110 described with reference to FIG. 9. Note that the lock ring 120 and the zoom ring 103, which are operation systems, are not shown for the purpose of showing the internal configuration.

The lock ring cam cylinder 120A is provided inside the lock ring 120 (not shown in FIG. 10). The lock ring cam cylinder 120A is provided to be rotationally interlocked with the lock ring 120. In addition, the lock ring cam cylinder 120A rotates around the optical axis L together with the lock ring 120 rotating around the optical axis L. A cam groove 121 is formed at the lock ring cam cylinder 120A and the cam groove 121 engages with a cam follower pin 131 formed at the second fixed cylinder 118.

Figure 11:
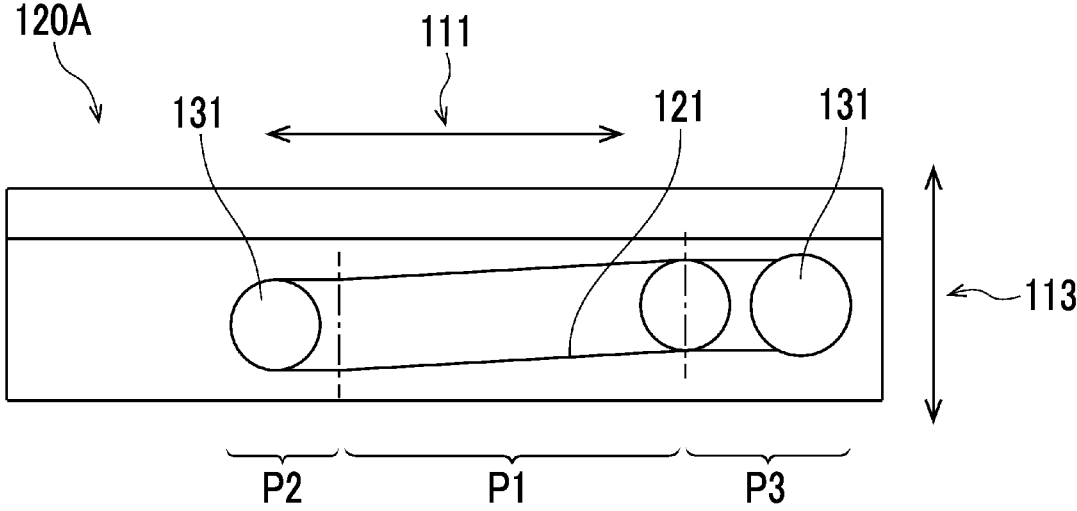
FIG. 11 is a geometry net of a lock ring cam cylinder.

FIG. 11 is a geometry net of the lock ring cam cylinder 120A.

The cam groove 121 of the lock ring cam cylinder 120A is formed such that the lock ring cam cylinder 120A moves in a direction (an arrow 113) along the optical axis L in a case where the lock ring cam cylinder 120A rotates around the optical axis L. The cam groove 121 is composed of a groove central portion P1, a groove end portion P2, and a groove end portion P3. The groove central portion P1 is a groove for movement of the lock ring cam cylinder 120A in a direction along the arrow 113 and is a straight groove that is inclined such that the lock ring cam cylinder 120A moves in the direction along the arrow 113 as the lock ring cam cylinder 120A rotates. The groove end portion P2 and the groove end portion P3 are grooves for fixation of the position of the lock ring cam cylinder 120A in the case of the zoom locking operation or the zoom unlocking operation. Since the cam groove 121 of the lock ring cam cylinder 120A is formed in such a manner, the zoom locking mechanism can be operated stably. Note that, although one cam groove 121 is shown in FIG. 11, three cam grooves 121 may be disposed at equal intervals in the circumferential direction of the lock ring cam cylinder 120A.

Figure 12:
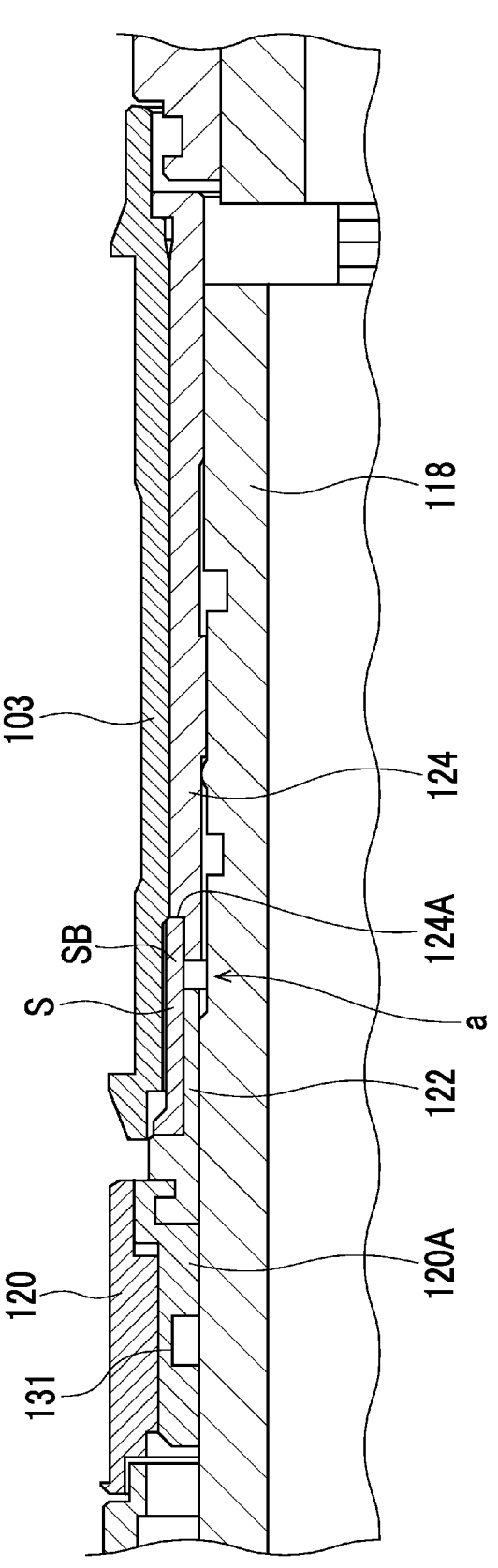
FIG. 12 is a cross-sectional view showing the state of the zoom locking mechanism in the case of a zoom unlocking operation.
Figure 13:
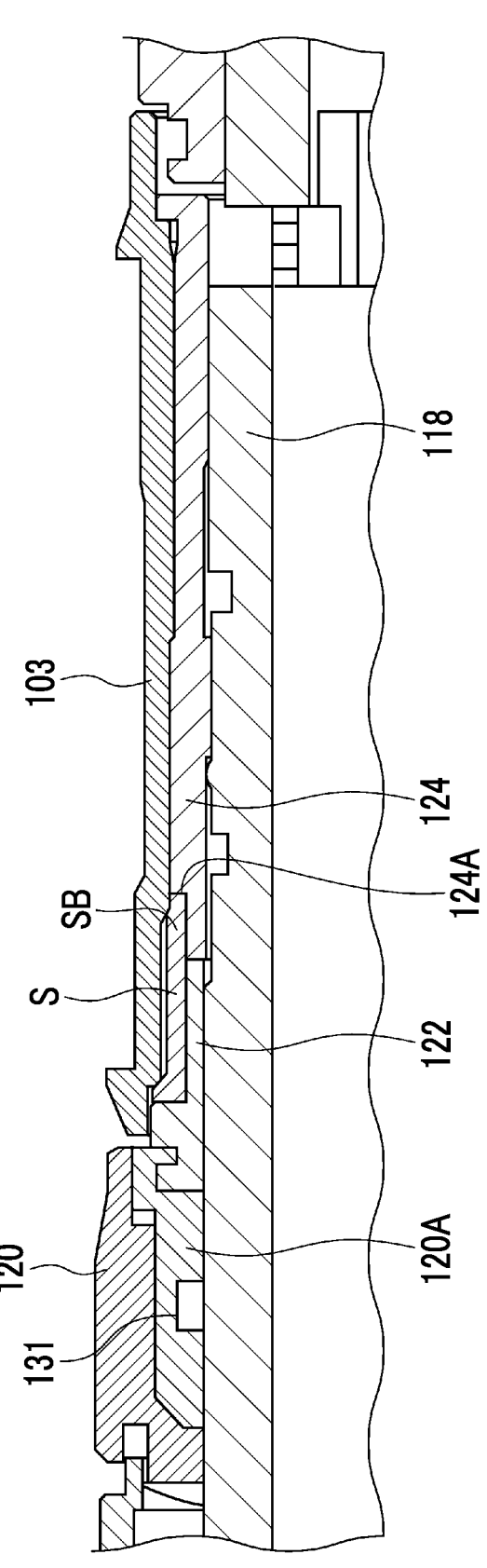
FIG. 13 is a cross-sectional view showing the state of the zoom locking mechanism in the case of a zoom locking operation.

The linear movement ring 122 engages with the adjacent lock ring cam cylinder 120A in the direction along the optical axis L (refer to FIGS. 12 and 13). In addition, the linear movement ring 122 includes a straight groove 117. The straight groove 117 engages with a cam follower pin 119 fixed to the second fixed cylinder 118, so that the linear movement ring 122 is restricted from rotating around the optical axis L. Therefore, the linear movement ring 122 is restricted from rotating around the optical axis L and moves forward and backward in the direction along the optical axis L as the lock ring cam cylinder 120A moves in the same direction. Further, stoppers S are fixed to the linear movement ring 122 (refer to FIG. 13). Each stopper S is formed of an elastic body and has a plate-like shape. For example, the stoppers S are plate-shaped members formed of rubber, and a set of two stoppers S is provided at each of three positions in a circumferential direction of the linear movement ring 122 at equal intervals. The number of stoppers S is not particularly limited and may be one as long as the rotation of the sliding ring 124 can be restricted. An end portion of each stopper S includes a mount portion SA with respect to the linear movement ring 122. In addition, an end portion of each stopper S that is opposite to the mount portion SA includes a protruding portion SB protruding from an end portion of the linear movement ring 122. The protruding portion SB abuts against an abutting portion 124A of the sliding ring 124. A switch between the zoom locking operation and the zoom unlocking operation is performed based on an abutting state of the protruding portion SB and the abutting portion 124A. Note that an abutting state of the mount portion SA and the abutting portion 124A in the case of the zoom locking operation and the zoom unlocking operation will be described later.

The sliding ring 124 is provided inside the zoom ring 103 (not shown in FIG. 10). The sliding ring 124 is rotationally interlocked with the zoom ring 103 and is a rotary member of the zoom ring 103. The sliding ring 124 is connected to the cam cylinder 114 by a connecting member (not shown). In addition, in a case where the sliding ring 124 rotates around the optical axis L, the cam cylinder 114 also rotates and thus a magnification change operation is performed.

Note that, in the present example, the zoom ring 103 and the sliding ring 124 are formed separately from each other. However, the zoom ring 103 and the sliding ring 124 may be integrally formed with each other. That is, the abutting portion 124A that abuts against the stoppers S may be formed on a part of the zoom ring 103.

[Zoom Locking Operation]

Next, the way in which each part of the zoom locking mechanism is operated in a case where the zoom locking operation is performed will be described with reference to FIGS. 12 and 13.

First, the state of the zoom locking mechanism in the case of the zoom unlocking operation will be described with reference to FIG. 12. FIG. 12 is a cross-sectional view showing the state of the zoom locking mechanism in the case of the zoom unlocking operation.

In the case of the zoom unlocking operation, the lock ring 120 is positioned on the focus ring 104 side. In addition, the lock ring cam cylinder 120A that is rotationally interlocked with the lock ring 120 and the linear movement ring 122 that engages with the lock ring cam cylinder 120A in the direction along the optical axis L are also positioned on the focus ring 104 side. A gap a is provided between the linear movement ring 122 and the sliding ring 124. The protruding portions SB of the stoppers S provided at the linear movement ring 122 abut against the abutting portion 124A of the sliding ring 124. In this case, the protruding portions SB simply abut against the abutting portion 124A without being crushed between the linear movement ring 122 and the sliding ring 124. Therefore, the protruding portions SB and the abutting portion 124A slide on each other. Accordingly, it is possible to perform any magnification change operation by operating the zoom ring 103 since rotation of the sliding ring 124 in the circumferential direction is not restricted. Note that, various shapes are adopted for the abutting portion 124A of the sliding ring 124. For example, as shown in FIG. 12, the abutting portion 124A is formed in a shoulder-like shape.

As described above, in the case of the zoom unlocking operation, the lock ring 120 is positioned on the focus ring 104 side. Accordingly, the protruding portions SB of the stoppers S simply abut against the abutting portion 124A without being crushed between the linear movement ring 122 and the sliding ring 124, rotation of the sliding ring 124 in the circumferential direction is not restricted, and the zoom ring 103 can be operated in any manner.

Next, the state of the zoom locking mechanism in the case of the zoom locking operation will be described with reference to FIG. 13. FIG. 13 is a cross-sectional view showing the state of the zoom locking mechanism in the case of the zoom locking operation.

In a case where the zoom locking operation is performed, the lock ring 120 is positioned on the zoom ring 103 side. In addition, the lock ring cam cylinder 120A that is rotationally interlocked with the lock ring 120 and the linear movement ring 122 that engages with the lock ring cam cylinder 120A in the direction along the optical axis L are also positioned on the zoom ring 103 side. In this case, the linear movement ring 122 and the sliding ring 124 are made close to each other, and there is no gap a therebetween (the gap a is made small). The protruding portions SB of the stoppers S provided at the linear movement ring 122 abut against the abutting portion 124A of the sliding ring 124 and are crushed between the linear movement ring 122 and the sliding ring 124. This is because, for example, movement of the sliding ring 124 in the direction along the optical axis L is restricted by a fixation pin (not shown) and the protruding portions SB are interposed between the linear movement ring 122 pressed toward the sliding ring 124 side along the optical axis L and the abutting portion 124A. In addition, since the protruding portions SB are crushed, the protruding portions SB and the abutting portion 124A are restricted from sliding on each other and the sliding ring 124 (the zoom ring 103) is restricted from rotating. Accordingly, the sliding ring 124 (the zoom ring 103) does not rotate freely and the zoom locking operation is performed.

As described above, in a case where the zoom locking operation is performed, the lock ring 120 is positioned on the zoom ring 103 side. Accordingly, the protruding portions SB of the stoppers S are crushed between the linear movement ring 122 and the sliding ring 124 and the protruding portions SB and the abutting portion 124A are restricted from sliding on each other, so that the zoom locking operation is performed. Note that, since the zoom locking mechanism is provided separately from a zoom mechanism that performs the magnification change operation, the magnification change operation is not performed in a case where the zoom locking operation is performed. Therefore, a user can perform the zoom locking operation with the zoom ring 103 at any position (at any focal length). Specifically, the user can perform the zoom locking operation by operating the lock ring 120 with the zoom ring 103 positioned at any position.

[Operation]

Next, the way in which the lock ring 120 is operated in a case where the zoom unlocking operation and the zoom locking operation are performed will be described.

Figure 14:
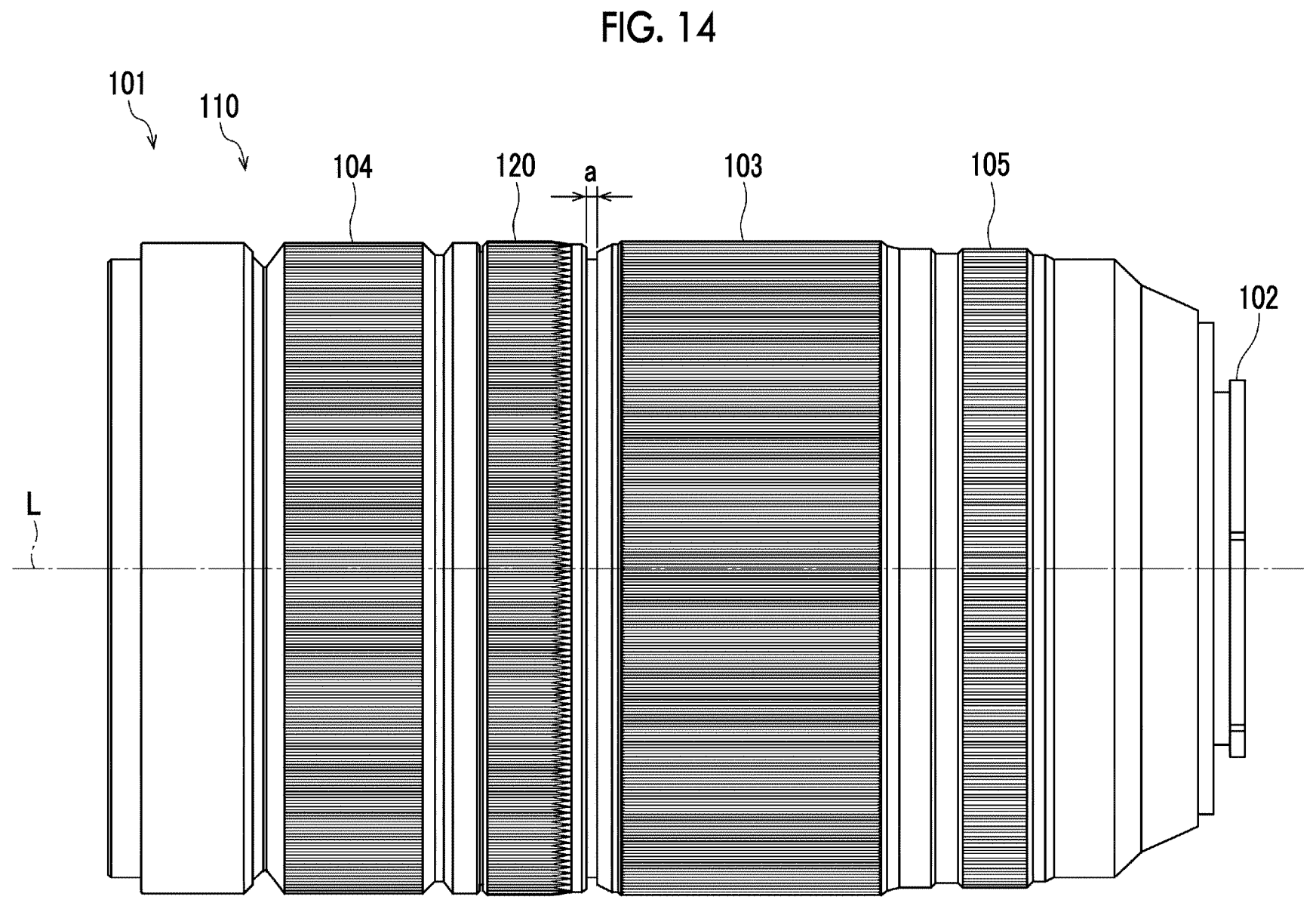
Figure 15:
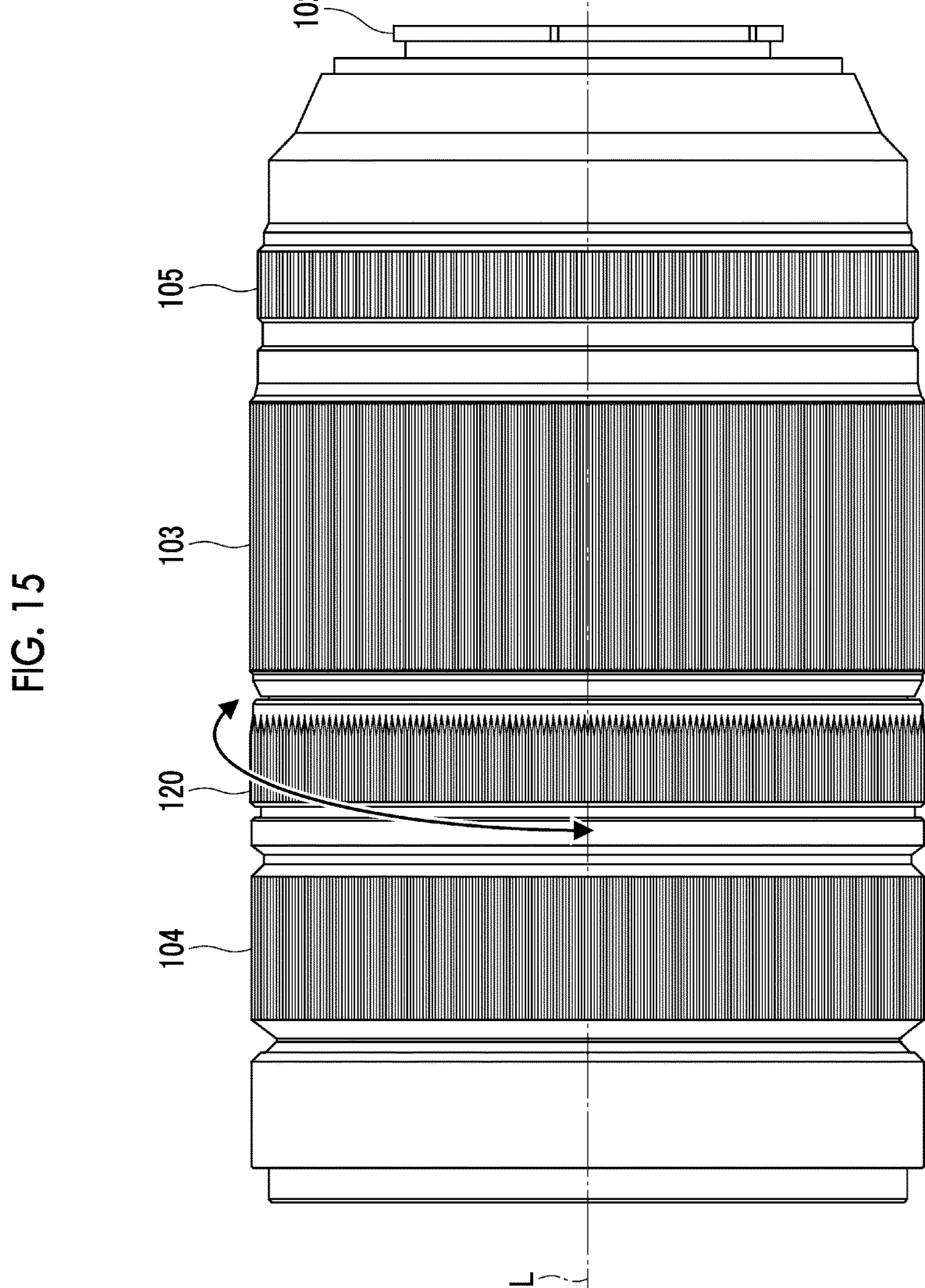
FIG. 15 is a view showing the way in which the lock ring is operated in a case where the zoom locking operation is performed.
Figure 16:
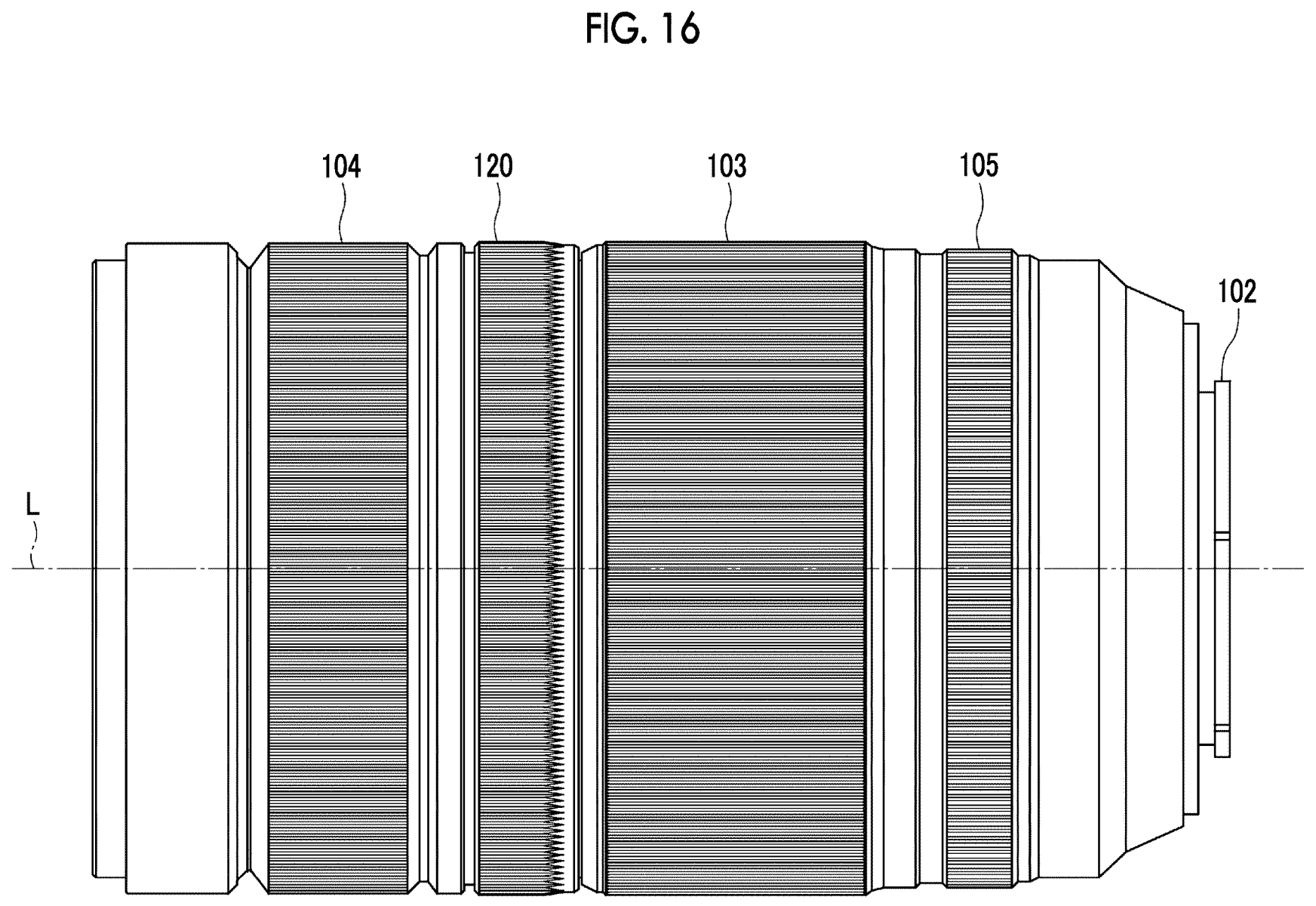

FIGS. 14 to 16 are views for description about a rotary operation of the lock ring 120 and are views showing the appearance of the lens barrel 110.

FIG. 14 is a view showing the position of the lock ring 120 in the case of the zoom unlocking operation, FIG. 15 is a view showing the way in which the lock ring 120 is operated in a case where the zoom locking operation is performed, and FIG. 16 is a view showing the position of the lock ring 120 in the case of the zoom locking operation.

As shown in FIG. 14, the lock ring 120 is positioned on the focus ring 104 side in the case of the zoom unlocking operation. Specifically, the lock ring 120 is positioned adjacent to the focus ring 104. In addition, in the case of the zoom unlocking operation, the gap a is provided between the lock ring 120 and the zoom ring 103.

As shown in FIG. 15, in a case where the zoom locking operation is to be performed, the lock ring 120 is rotated around the optical axis L as represented by an arrow in the drawing. Note that the rotation direction of the lock ring 120 and forward and backward movement along the optical axis L are appropriately designed. The lock ring 120 moves in the direction along the optical axis L (toward a proximal end side of the lens barrel 110) as the lock ring 120 rotates around the optical axis L.

In a case where the lock ring 120 is operated as described with reference to FIG. 15, the lock ring 120 is positioned adjacent to the zoom ring 103 in the case of the zoom locking operation as shown in FIG. 16. In a case where the lock ring 120 is positioned adjacent to the zoom ring 103 in this manner, the protruding portions SB of the stoppers S and the abutting portion 124A of the sliding ring 124 are restricted from sliding on each other as described above and the zoom locking operation is performed.

As described above, according to the zoom locking mechanism, the sliding ring 124 is restricted from rotating around the optical axis L by the protruding portions SB of the stoppers S and the zoom locking operation is performed. Accordingly, in the case of the zoom lens device including the zoom locking mechanism, falling because of the own weight thereof can be suppressed. In addition, according to the present zoom locking mechanism, the sliding ring 124 can be restricted from rotating with the sliding ring 124 at any position other than a wide angle end or a telephoto end. In addition, according to the zoom locking mechanism, since the zoom locking mechanism is provided separately from a zoom mechanism that performs the magnification change operation, the magnification change operation is not performed in a case where the zoom locking operation is performed.

Although examples of the present invention have been described above, it is needless to say that the present invention is not limited to the above-described embodiments and various modifications can be made without departing from the spirit of the present invention.

EXPLANATION OF REFERENCES

1: zoom lens device
2: second cam follower pin
3: first cam follower pin
4: first straight groove
5: focus unit
6: fixation cam follower pin
7: first lens holding portion
8: third cam follower pin
9: base frame
9A: second lens holding portion
9B: third lens holding portion
10: moving cylinder
11: proximal end portion lens holding portion
20: cam cylinder
22: first cam groove
24: second cam groove
26: third cam groove
30: fixed cylinder
32: second straight groove
40: base member

What is claimed is:
1. A zoom lens device comprising:
a fixed cylinder;
a cam cylinder that is positioned outside the fixed cylinder;
a first movement group that is positioned outside the cam cylinder and that includes a moving cylinder that includes a first lens group provided at a distal end portion; and
a second movement group that is positioned inside the fixed cylinder, includes a second lens group, and includes a base frame that holds the second lens group,
wherein the first movement group and the second movement group move so that a magnification change operation is performed in a case where the cam cylinder rotates,
the first movement group includes
a first straight groove that guides the first movement group straight and that is formed at the moving cylinder, and
a first cam follower pin that engages with a first cam groove formed at the cam cylinder and that is formed at the moving cylinder, and
the second movement group includes
a second cam follower pin that is formed at the base frame, penetrates a second straight groove formed at the fixed cylinder and a second cam groove formed at the cam cylinder, and engages with the first straight groove.

2. The zoom lens device according to claim 1, wherein the first straight groove is formed at an inner peripheral surface of the first movement group.

3. The zoom lens device according to claim 1, wherein the first movement group includes one or more first straight grooves in a circumferential direction.

4. The zoom lens device according to claim 1, wherein the first cam follower pin engages only with the first cam groove.

5. The zoom lens device according to claim 1, wherein the cam cylinder includes a third cam groove that engages with a fourth cam follower pin provided at the fixed cylinder, and the cam cylinder rotates to move in an optical axis direction with respect to the fixed cylinder.

6. An optical device comprising:

a zoom lens device comprising:

a fixed cylinder;

a cam cylinder that is positioned outside the fixed cylinder;

a first movement group that is positioned outside the cam cylinder and that includes a moving cylinder that includes a first lens group provided at a distal end portion; and a second movement group that is positioned inside the fixed cylinder, includes a second lens group, and includes a base frame that holds the second lens group, wherein the first movement group and the second movement group move so that a magnification change operation is performed in a case where the cam cylinder rotates, the first movement group includes a first straight groove that guides the first movement group straight and that is formed at the moving cylinder, and a first cam follower pin that engages with a first cam groove formed at the cam cylinder and that is formed at the moving cylinder, and the second movement group includes a second cam follower pin that is formed at the base frame, penetrates a second straight groove formed at the fixed cylinder and a second cam groove formed at the cam cylinder, and engages with the first straight groove.

7. A zoom lens device comprising:

a fixed cylinder;

a cam cylinder that is positioned outside the fixed cylinder;

a first movement group that is positioned outside the cam cylinder and that includes a moving cylinder that includes a first lens group provided at a distal end portion; and a second movement group that is positioned inside the fixed cylinder, that includes a second lens group, and that includes a base frame that holds the second lens group, wherein the first movement group and the second movement group move so that a magnification change operation is performed in a case where the cam cylinder rotates, the first movement group includes a first straight groove that guides the first movement group straight and that is formed at the moving cylinder, and a first cam follower pin that engages with a first cam groove formed at the cam cylinder, and that is formed at the moving cylinder, and the second movement group includes a second cam follower pin that engages with the first straight groove of the first movement group via the fixed cylinder and the cam cylinder and that is formed at the base frame, and a third cam follower pin that is formed at the base frame, and engages with a second straight groove formed at the fixed cylinder and a second cam groove formed at the cam cylinder.

8. The zoom lens device according to claim 7, wherein the first straight groove is formed at an inner peripheral surface of the first movement group.

9. The zoom lens device according to claim 7, wherein the first movement group includes one or more first straight grooves in a circumferential direction.

10. The zoom lens device according to claim 7, wherein the first cam follower pin engages only with the first cam groove.

11. The zoom lens device according to claim 7, wherein the cam cylinder includes a third cam groove that engages with a fourth cam follower pin provided at the fixed cylinder, and the cam cylinder rotates to move in an optical axis direction with respect to the fixed cylinder.

12. An optical device comprising:

a zoom lens device comprising:

a fixed cylinder;

a cam cylinder that is positioned outside the fixed cylinder;

a first movement group that is positioned outside the cam cylinder and that includes a moving cylinder that includes a first lens group provided at a distal end portion; and a second movement group that is positioned inside the fixed cylinder, that includes a second lens group, and that includes a base frame that holds the second lens group, wherein the first movement group and the second movement group move so that a magnification change operation is performed in a case where the cam cylinder rotates, the first movement group includes a first straight groove that guides the first movement group straight and that is formed at the moving cylinder, and a first cam follower pin that engages with a first cam groove formed at the cam cylinder, and that is formed at the moving cylinder, and the second movement group includes a second cam follower pin that engages with the first straight groove of the first movement group via the fixed cylinder and the cam cylinder and that is formed at the base frame, and a third cam follower pin that is formed at the base frame, and engages with a second straight groove formed at the fixed cylinder and a second cam groove formed at the cam cylinder.

* * * * *